US012411743B2

(12) United States Patent
Ashman et al.

(10) Patent No.: US 12,411,743 B2
(45) Date of Patent: Sep. 9, 2025

(54) METHODS OF IMMUTABLE DEPLOYMENT OF PERSISTENT RELATIONAL DATABASES

(71) Applicant: Salesforce, Inc., San Francisco, CA (US)

(72) Inventors: Damon Ashman, Indianapolis, IN (US); Vi Nguyen, Bellevue, WA (US); Rishi Zaveri, West Bloomfield, MI (US); Arockia Praveen Thargis, Indianapolis, IN (US); Omar Jaber, Bellevue, WA (US); Brennan Lindamood, Attica, IN (US); Bradley Kenneth Michel, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 71 days.

(21) Appl. No.: 18/379,314

(22) Filed: Oct. 12, 2023

(65) Prior Publication Data
US 2025/0123932 A1 Apr. 17, 2025

(51) Int. Cl.
G06F 11/00 (2006.01)
G06F 11/14 (2006.01)
G06F 11/20 (2006.01)

(52) U.S. Cl.
CPC ...... *G06F 11/2023* (2013.01); *G06F 11/1469* (2013.01); *G06F 2201/80* (2013.01)

(58) Field of Classification Search
CPC ............ G06F 11/1425; G06F 11/1469; G06F 11/2023; G06F 11/203; G06F 11/2033; G06F 11/2035; G06F 11/2038; G06F 2201/80
See application file for complete search history.

(56) References Cited

U.S. PATENT DOCUMENTS

| 10,922,012 | B1   |   | 2/2021 | Ummadi  |              |
|------------|------|---|--------|---------|--------------|
| 11,392,399 | B2   | * | 7/2022 | Kirmse  | G06F 11/3006 |
| 2019/0188406 | A1 | * | 6/2019 | McKelvie | G06F 21/6218 |
| 2021/0084103 | A1 | * | 3/2021 | Smith   | G06F 16/285  |
| 2023/0195584 | A1 | * | 6/2023 | Radev   | G06F 8/65    |
|              |    |   |        |         | 711/162      |
| 2023/0252045 | A1 | * | 8/2023 | Kandi   | G06F 16/219  |
|              |    |   |        |         | 707/615      |
| 2024/0020108 | A1 | * | 1/2024 | Sinha   | G06F 11/2023 |

* cited by examiner

*Primary Examiner* — Marc Duncan
(74) *Attorney, Agent, or Firm* — Butzel Long

(57) ABSTRACT

Systems and methods are provided for replacing a first server of a first node a computer network by adding a second server configured with a database system as a second node to the computer network. A snapshot of a first database of database files that is communicatively coupled to the first node may be taken. The snapshot may be applied to the second server by attaching the snapshot of the first database as a second database to the second server and configuring the second server to match the first server. A failover of the computer network to the second node with the second server having the second database attached may be forced. Voting may be switched to the second server of the second node of the computer network and the first node of the computer network may be removed when the forced failover is successful.

12 Claims, 7 Drawing Sheets

METHODS OF IMMUTABLE DEPLOYMENT OF PERSISTENT RELATIONAL DATABASES

BACKGROUND

In mutable infrastructure environments, stateful machines can be maintained with the latest updates, security patches, and bug fixes by utilization of in-place upgrades. Stateful machines typically expect a response, track information, and resend the request if no response is received. In-place upgrades generally involve an update of an operating system or application on a computer without removing the older version first. Maintaining stateful machines using in-place upgrades allows for an older operating system to be replaced by a newer one while keeping settings, server roles, and data intact. That is, in-place upgrades can be performed to switch from an older to a newer version of an operating system and preserving files, settings, and applications. In-place upgrades can be at least partially automated through systems management software, but there can be a variety of issues, misconfigurations, and the like that can cause in-place upgrades to fail.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1:
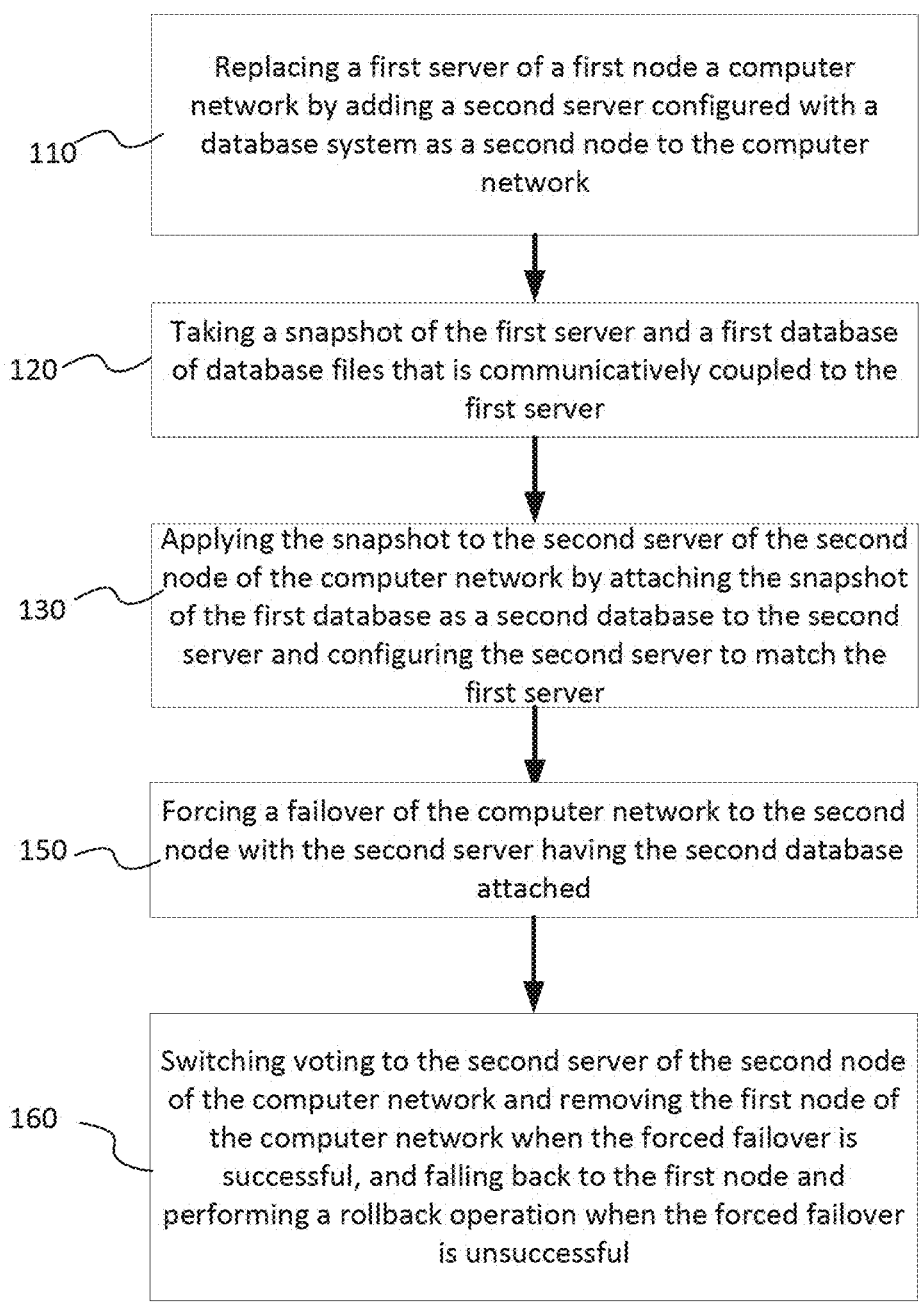
FIGS. 1-4 show example methods of immutable deployment of persistent relational databases according to implementations of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Immutable deployment may be a process where stateful aspects of a service provided by a computer and/or computer network are decoupled from an operating system (OS) and/or binaries of a database engine of a database system. As used throughout, stateful systems typically expect a response, track information, and/or resend the request if no response is received. In contrast, a stateless system may send a request to the server and relays the response (or the state) back without storing any information. Typically, immutable deployment may be performed so that the OS and/or database engine may be replaced with newly updated binaries, without losing and/or corrupting stateful datastores such as relational databases.

In mutable infrastructure environments where changes may be made after deployment, stateful machines may be updated with the latest updates, security patches, and/or bug fixes by using in-place upgrades. In-place upgrades may allow the transition from an older operating system to a newer one while keeping settings, server roles, and/or data intact. Currently, in-place upgrades may be at least partially automated through systems management software.

However, there may be risk involved with in-place upgrades. Although testing may alleviate some concerns, there may be the risk of drift, environmental issues, misconfigurations, and/or other issues that may cause in-place upgrades to fail. That is, there may be risk with performing in-place upgrades that may affect overall availability and/or stability of a computer system or network.

Although major updates may be performed by in-place upgrades, it is typically risky, as rollbacks generally become more difficult if the upgrade fails when performing in-place upgrades. To address this, the typical approach for performing major updates in a production environment is to add new hardware and migrate stateful databases over to the new hardware. However, such upgrades generally must be carefully planned and executed, and can take a considerable investment in time and resources.

The above-described approach does not work well in a public cloud infrastructure, which typically promotes using continuous improvement and continuous delivery mechanisms to update services in an idempotent fashion. However, previous approaches to immutable deployment only work well with stateless services, as old servers and/or virtual machines are swapped out with new ones. That is, previous approaches to immutable deployment do not work well where there is a stateful piece to a service which needs to persist after replacing older binaries that make up the service with newly updated ones.

Implementations of the disclosed subject matter are directed to immutable deployment, where stateful aspects of a service are decoupled from an operating system (OS) and binaries of a database engine so that newly updated binaries may replace them without losing and/or corrupting stateful datastores such as relational databases. The disclosed subject matter may be used for small, incremental updates such as a hotfix, and/or used for large version updates. Implementations of the disclosed subject matter provide a repeatable, consistent, and automated method for delivering updates in software while maintaining the stateful aspects of the service. That is, the disclosed subject matter decouples the stateful aspects of a service from the stateless ones by introducing a new server (or virtual machine) to replace an existing one, where the new server has the updates and database server software installed and configured.

In implementations of the disclosed subject matter, a snapshot may be taken from a server or virtual machine. As used throughout, a snapshot may be a copy of the one or more volumes and/or storage devices (e.g., hard disk drives, solid state drives, memory devices, and the like) that the database files reside on. This differs from a snapshot of machine (e.g., a server, virtual server, or other computing device) which includes storage device having the operating system (OS) and database binaries. The snapshot may be applied to new server or virtual machine by attaching and configuring the snapshot of the databases on new node formed by the new server or virtual machine. A forced (manual) failover may be performed on the new virtual machine to integrate it into the computer network, and one or more of the old nodes (e.g., servers, databases, and the like) may be removed. Implementations of the disclosed subject matter may eliminate the need to keep a stateful machine patched in place by replacing such a machine with a new server or virtual machine that includes updates (e.g., a new set of binaries).

Implementations of the disclosed subject matter may improve distributing and applying updates to software and computing systems to correct errors, security vulnerabilities, bugs, and/or update versions of applications, database engines, and/or operating systems. Such implementations may decrease vulnerabilities of software, applications, databases, and/or computer systems to cyberattacks, data breaches, and/or ransomware attacks, which may reduce security risks for a computing system.

With the continued rise in cyberattacks, data breaches, and/or ransomware attacks, organizations may be required to maintain a predetermined level of compliance, and implementations of the disclosed subject matter may allow computer system to increase adherence to compliance standards.

To increase security and reduce risks of data breaches, and/or ransomware attacks, it becomes increasingly important to fix security vulnerabilities, bugs, implement patches, and/or perform updates as soon as possible. Implementations may ensure that software, applications, and/or computer systems are up-to-date, which may support computer and database system uptime (e.g., providing access to resources to users). Implementations of the disclosed subject matter may be used to implement feature improvements and/or functionality improvements to applications, software, databases, and/or computer systems.

Implementations of the disclosed subject matter provide for scaling of computing device (e.g., a server, virtual server, or the like) as part of patching, updates, and the like. That is, the disclosed subject matter allows for controlling an increase or decrease in computing resources of a computer network as needed. That is, as demand for computing resources increases or decreases, implementations of the disclosed subject matter may be used to increase or decrease computing resources for a computer network.

The same implementations of the disclosed subject matter may be used to apply both minor upgrades and/or major upgrades. That is, the same implementations may be used regardless of the size, complexity, and/or type of upgrade, bug fix, patch, or the like. Implementations of the disclosed subject matter may be used with failover clusters which utilize shared storage. A failover cluster may be a group of computers that work together to increase the availability and scalability of clustered roles, such as providing one or more applications and/or services. The clustered servers (i.e., nodes) may be communicatively coupled to one another. If one or more of the cluster nodes fail, other nodes may provide service. This may be known as a failover, where one node fails and another node provides a service. The clustered roles are proactively monitored to verify that they are working properly. If they are not working, they are restarted or moved to another node. The failover clusters may provide Cluster Shared Volume (CSV) functionality that provides a consistent, distributed namespace that clustered roles may use to access shared storage from all nodes. With the failover clustering, disruption in service experienced by users may be minimized.

Implementations of the disclosed subject matter remove the need to have a central control plane and/or state management platform. Central control planes may be used in computer networks to create routing tables, manage network traffic, maintain the network topology, provide security, and/or provide load balancing. A state management platform may capture various aspects of a computer network such as which links are alive and how switches are forwarding traffic. Implementations of the disclose subject matter may have computer networks without the need for a central control plane or state management platforms, which may reduce network complexity and increase network reliability and/or minimize disruptions in network service.

FIGS. 1-4 show an example method 100 of an immutable deployment of a persistent relational database according to implementations of the disclosed subject matter. At operation 110, a first server of a first node a computer network may be replaced by adding a second server configured with a database system as a second node to the computer network. The first node may include the first server, which may be server 210 and/or server 220 of the computer network 200 shown in FIG. 5, and/or server 700 of the computer network 400 shown in FIG. 8. The first node may include a first database, which may be database 212 that is communicatively coupled to server 210, the database 222 which may be communicatively coupled to server 220, and/or database 710 communicatively coupled to server 700 shown in FIG. 8. The second node may include a second server, which may be server 240 communicatively coupled to database 242 shown in FIG. 5, server 244 communicatively coupled to database 242 shown in FIG. 6, and/or server 800 communicatively coupled to database 810 shown in FIG. 8. In some implementations, the first server and/or the second server may be a virtual machine. The second server (e.g., server 240 shown in FIG. 5) may include updates, patches (e.g., security patches), bug fixes, and the like that may not be installed on the first server (e.g., server 210 shown in FIG. 5). In some implementations, the second server may be configured with a new operating system (OS), a new version of an OS, a new database engine, a new version of a database engine, a software update, a software patch, and/or a software bug fix, where the software may be an application or the like.

Figure 2:
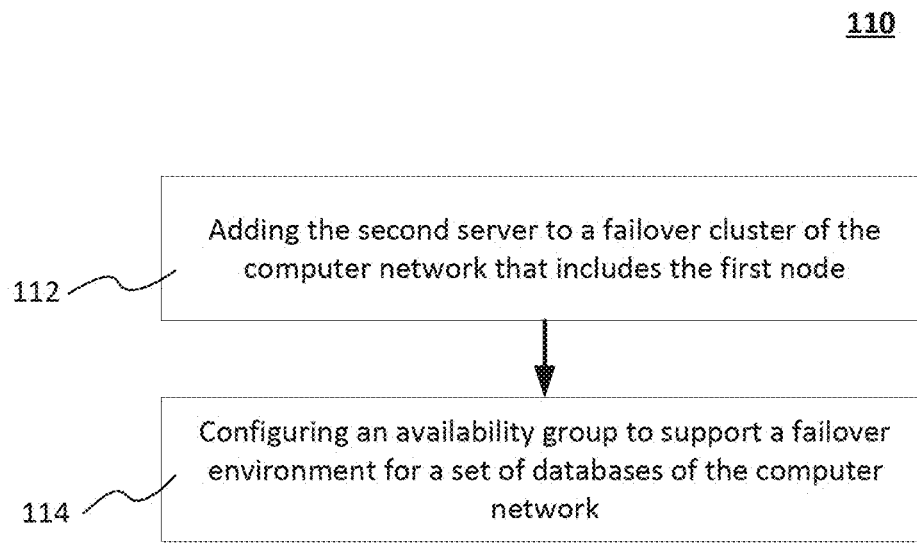

FIG. 2 shows optional additional operations of the adding the second server as the second node to the computer network of operation 110 of FIG. 1. For example, at operation 112, the second server (e.g., server 240) may be added to a failover cluster of the computer network that includes the first node (e.g., server 210). As described throughout, a failover cluster may be a group of computers that work together to increase the availability and scalability of clustered roles, such as providing one or more applications and/or services. The clustered servers (i.e., nodes) may be communicatively coupled to one another. If one or more of the cluster nodes fail, other nodes may provide service. Server 210 and/or server 220 shown in FIGS. 5-6 may be part of a failure cluster of computer network 200, and server 240 and/or server 244 may be added to the failover cluster. In another example, the server 700 shown in FIG. 8 may be part of a failure cluster for computer network 400, and server 800 may be added to the failover cluster.

At operation 114, the adding the second server to the failover cluster may include configuring an availability group to support a failover environment for a set of databases of the computer network. An availability group may support a replicated environment for a discrete set of user databases (e.g., availability databases). An availability group may fail over at the level of an availability replica. An availability replica provides redundancy at the database level for a set of databases in one availability group. For example, the availability group of a failover cluster of computer network 200 may include server 210 having database 212 and/or server 220 having database 222, and the server 240 and database 242 may be added to availability group of this the failover cluster. That is, if one of these servers fails, one of the remaining servers of the availability group of this failover cluster may handle one or more requests that the failed server and/or database would have previously handled.

Figure 5:
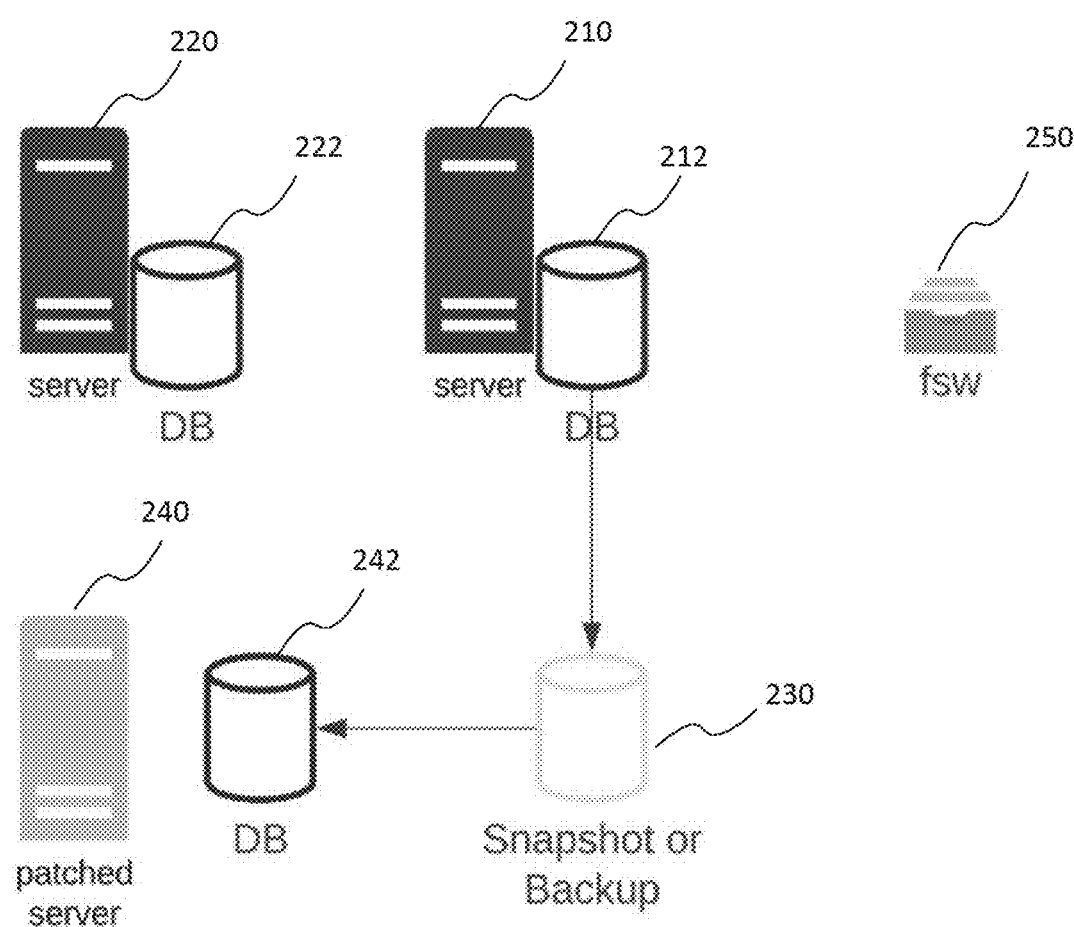
FIG. 5 shows an example where a new server and database are configured as a new node to a computer network using a snapshot based on the example method shown in FIG. 1 according to an implementation of the disclosed subject matter.

At operation 120, a snapshot (e.g., snapshot 230 shown in FIGS. 5-6) may be taken of a first database of database files that is communicatively coupled to the first server. The snapshot may be applied to the second server of the second node of the computer network in operation 130. For example, as shown in FIG. 5, the snapshot 230 may be applied to server 240 to replicate the configuration and/or data of server 210 and/or database 212. The server 240 may include updates (e.g., updates, patches, bug fixes, and the like) that may not be included in server 210 from which the snapshot 230 is taken. As discussed below in connection with operation 130, the snapshot may be a copy of the one or more volumes and/or storage devices that the database files reside on. As shown in FIG. 5, a snapshot 230 of the database 212 of server 210 may be taken and applied to database 242 that is coupled to server 240.

At operation 130, the snapshot of the first database (e.g., snapshot 230 shown in FIG. 5, which may include a snapshot of the database 212) may be attached as a second database (e.g., database 240) to the second server (e.g., server 240) and the second server may be configured to match the first server (e.g., server 210). The snapshot may be a copy of the one or more volumes and/or storage devices that the database files reside on. That is, the second server may be configured so that one or more settings of the second server may match those of the first server, and the database of the second server may match the database of the first server. The matching of the one or more settings and/or configuration of the first server by the second server may be done so that the second server may replace the first server and may retain the operational characteristics of the first server within the computer network, while having a new OS, a new version of an OS, a new database engine, a new version of a database engine, a software update, a software patch, and/or a software bug fix. The matching of the first database with the second database by using the snapshot may maintain the database records of the first server and first database that may be replaced with the second server and second database.

In some implementations, attaching the snapshot of the first database as the second database to the second server at operation 130 may include keeping at least the first database in a recovery mode. For example, the first database (e.g., database 212) may be kept in this recovery mode until the data from the first database can be fully transferred and/or copied to the second database (e.g., database 242 that is communicatively coupled to server 242). When the transference and/or copying of the data is completed, the first database may exit the recovery mode.

In some implementations, the method 100 of FIG. 1 may include the operation of restoring using backup data when the taking of snapshot of the computer network from the first node fails at operation 120. The restored backup data may be applied to the second server (e.g., server 240) when the snapshot fails instead of operation 130 as described above, and the restored backup may be attached to the second database (e.g., database 242).

In some implementations, the operations 110, 120, and 130 may be similarly performed with server 220 being the first server and database 222 being the first database of the first node, and server 244 being the second server and database 246 being the second database of the second node.

At operation 150, a failover of the computer network (e.g., computer network 200 shown in FIGS. 5-7 and/or computer network 400 shown in FIG. 8) to the second node with the second server (e.g., server 240) having the second database (e.g., database 242) attached may be forced.

When the forced failover is successful, voting may be switched to the second server (e.g., server 240) of the second node of the computer network, as voting may be used by members of a cluster to determine whether there is a quorum as described below, and the first node of the computer network may be removed at operation 160.

A quorum of the cluster may determine the number of failures that the cluster can sustain while still remaining online. A quorum is designed to handle the scenario when there is a problem with communication between subsets of cluster nodes, so that multiple servers do not attempt to simultaneously host a resource group and/or write to the same storage at the same time. By having this concept of quorum, the cluster (e.g., a failover cluster) may force the cluster service to stop in one of the subsets of nodes to ensure that there is only one true owner of a particular resource group. Once nodes which have been stopped can once again communicate with the main group of nodes, they will automatically rejoin the cluster and start their cluster service. Voting may be used by members of the cluster to determine whether there is a quorum. The second server may not be a voting member of the cluster (e.g., the failover cluster) until the failover is successful. At that point, the second server may be given voting rights, and the first server (which was a voting member of the cluster) may be removed. In some implementations, the removing the first node of the computer network at operation 160 may include removing the first node from a failover cluster and an always-on availability group. When the forced failover is unsuccessful at operation 160, the computer network may fall back on the first server of the first node and a rollback operation may be performed.

In some implementations, the removing the first node of the computer network may include removing the first node from a failover cluster and an always-on availability group. An always-on availability group may provide high availability, disaster recovery, and read-scale balancing (e.g., balancing of a read-scale availability of a group of databases that are copied to other instances to a server and/or database for read-only workload). That is, the first node may be removed from the failover cluster and the always-on availability group when the forced failover to the second node is successful, as the second node may be operational and the first node is no longer needed an may be removed. However, when the forced failover is unsuccessful at operation 160, the computer network may fall back on the first server of the first node and a rollback operation may be performed.

Similarly, a failover of the computer network to the node with server 244 having database 246 may be forced at operation 150. When the forced failover is successful, voting may be switched to the server 244, and the first node of the computer network (e.g., server 210 and/or server 220) may be removed at operation 160. When the forced failover is unsuccessful at operation 160, the computer network may fall back on the server 210 and/or server 220, and a rollback operation may be performed.

When the forced failover is successful, voting may be switched to the second server (e.g., of the second node of the computer network and the first node of the computer network may be removed at operation 160.

Figure 7:
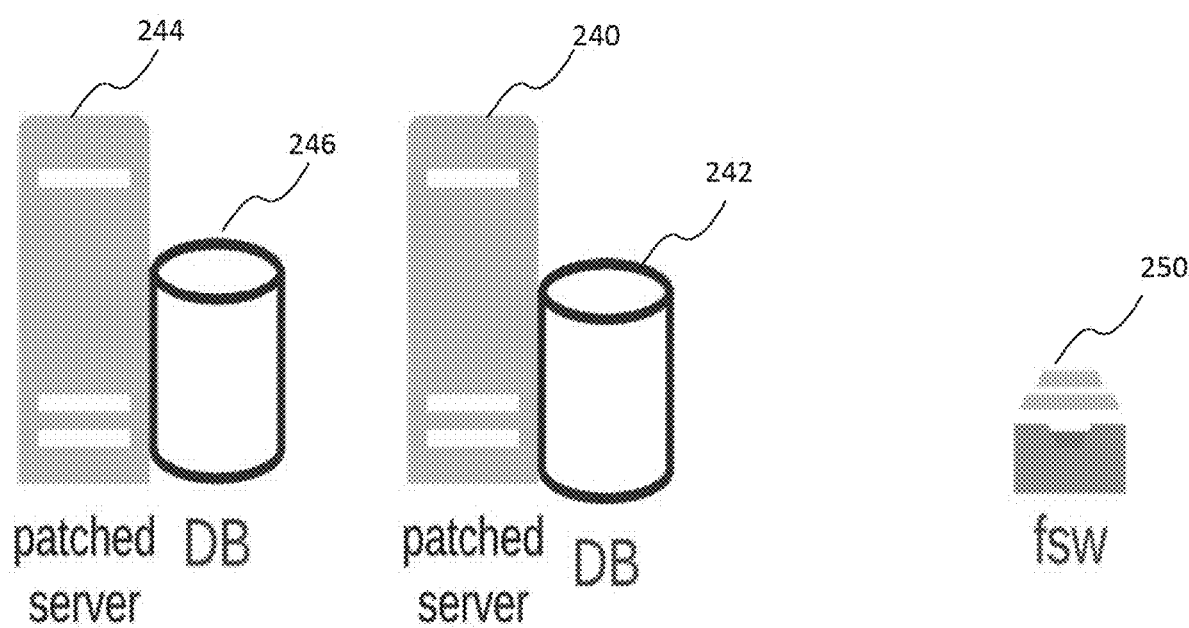
FIG. 7 shows at least one old node being removed from the cluster so that the one or more new nodes remain according to an implementation of the disclosed subject matter.

FIG. 7 shows an example where server 240, database 242, server 244, and database 246 have been added to the computer network 200, and server 210, database 212, server 220, and database 222 have been removed after operation 160 using method 100 described above and shown in FIGS. 1-4.

Although the operations of method 100 is described throughout as adding server 240, database 242, server 244, and/or database 246, other servers and/or databases may be added, and server 210, server 220, and/or other servers may be removed after the new servers have been added and the forced failovers are successful.

Figure 6:
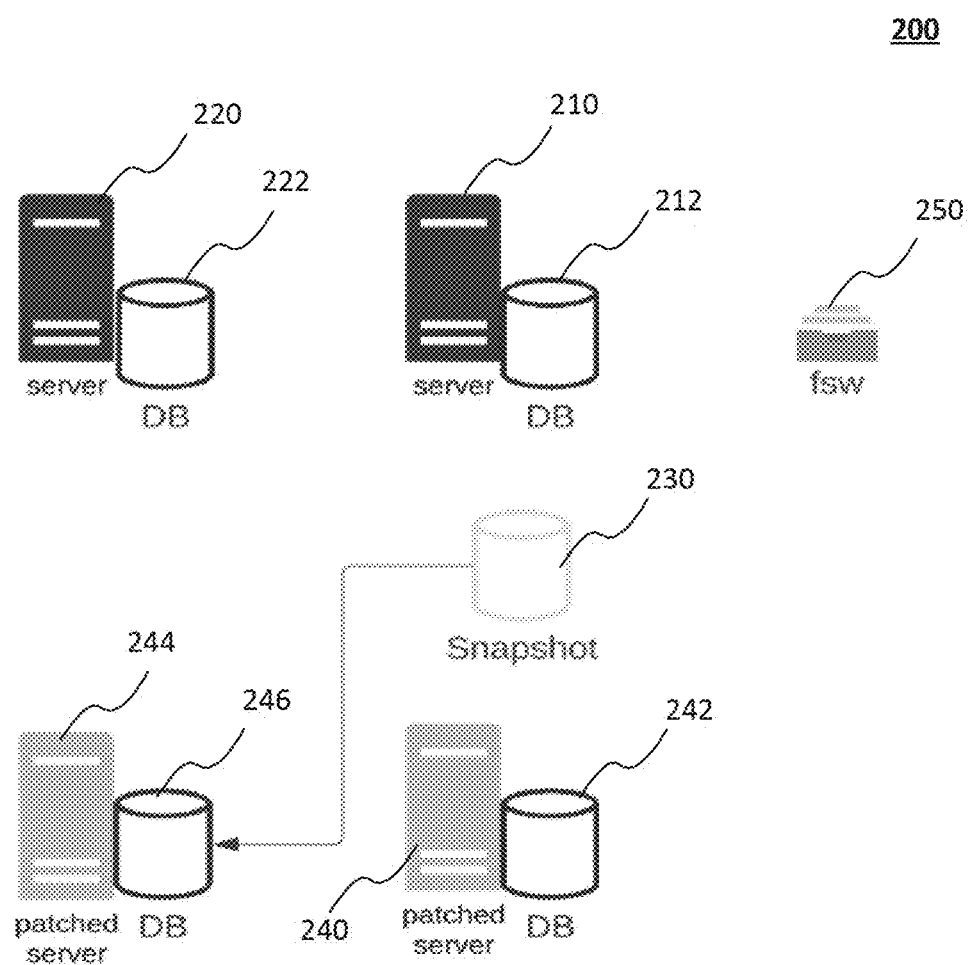
FIG. 6 shows a snapshot being applied to the new node of the computer system according to an implementation of the disclosed subject matter.

The computer network 200 of FIGS. 5-7 may include a File Share Witness (e.g., FSW 250) which may be a file share that is available to all nodes in a cluster (e.g., a high availability cluster), such as the cluster that includes one or more of the servers 210, 220, and/or 240, and/or one or more of the databases 212, 222, and/or 242. The FSW may provide an additional quorum vote when necessary, to ensure that a cluster continues to run in the event of an outage.

The file share witness may be used when a cluster spans two or more data center sites and/or when there is an even number of total nodes in a cluster. In high availability clustering, one strategy to ensure surviving nodes continue to run and/or take over the work of one or more failed nodes is to employ a quorum system. The quorum system gives every node a "vote." Cluster operations may continue if most nodes are available (e.g., a predetermined number of nodes of the total number of nodes available) to ensure the remaining nodes of the cluster are not overloaded. If a quorum is not met (i.e., there are not a predetermined number of nodes of the cluster available), cluster operations may cease.

For example, if one of the servers (e.g., server 210, server 220, or server 240) were to fail, the File Share Witness (FSW 250) may confirm the operation of the remaining two nodes and cast a third vote to reach a quorum.

Figure 3:
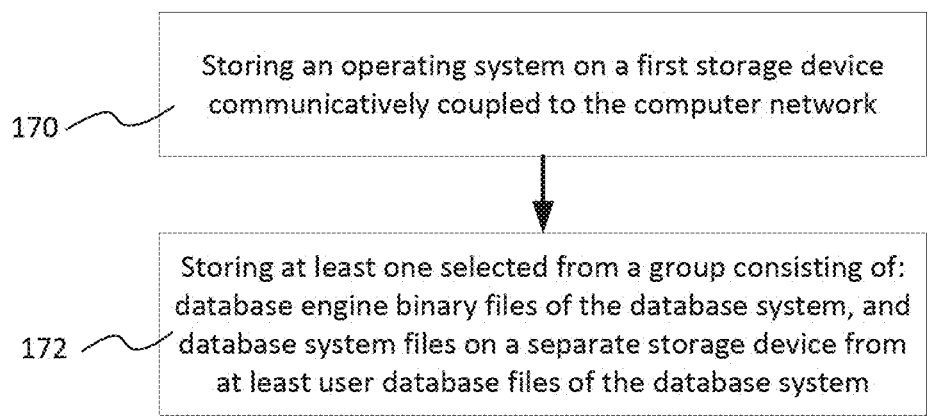

FIG. 3 shows additional example operations of method 100 of FIG. 1. At operation 170, an operating system may be stored on a first storage device communicatively coupled to the computer network. At operation 172, a database engine binary files of the database system and/or database system files may be stored on a separate storage device from at least user database files of the database system. This arrangement may allow the operations shown in FIG. 1 and described above to be performed.

Figure 4:
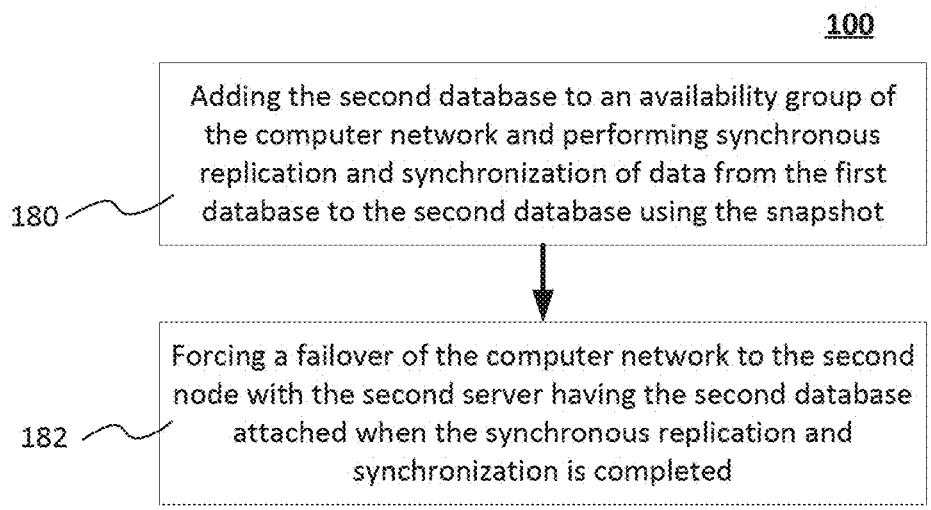

FIG. 4 shows additional example operations of method 100 of FIG. 1. At operation 180, the second database (e.g., database 242) may be added to an availability group of the computer network, and synchronous replication and synchronization of data from the first database to the second database may be performed using the snapshot. For example, the added database 242 may support the database 212, and replication and synchronization of data from database 212 to added database 242 may be performed.

At operation 182, a failover of the computer network to the second node with the second server having the second database attached may be forced when the synchronous replication and synchronization is completed. For example, a failover operation may be performed so that the server 240 and/or database 242 handles requests that server 210 and/or database 212 would previously handle. The second server of the second node may be added to the availability group as a non-voting member. For example, the server 240 may be added to the availability group as a non-voting member until it is determined that the failover operation is successful. In this example, if the failover operation is successful, the voting may be switched to the server 240, and the server 210 may be removed as described above in connection with operation 160.

Figure 8:
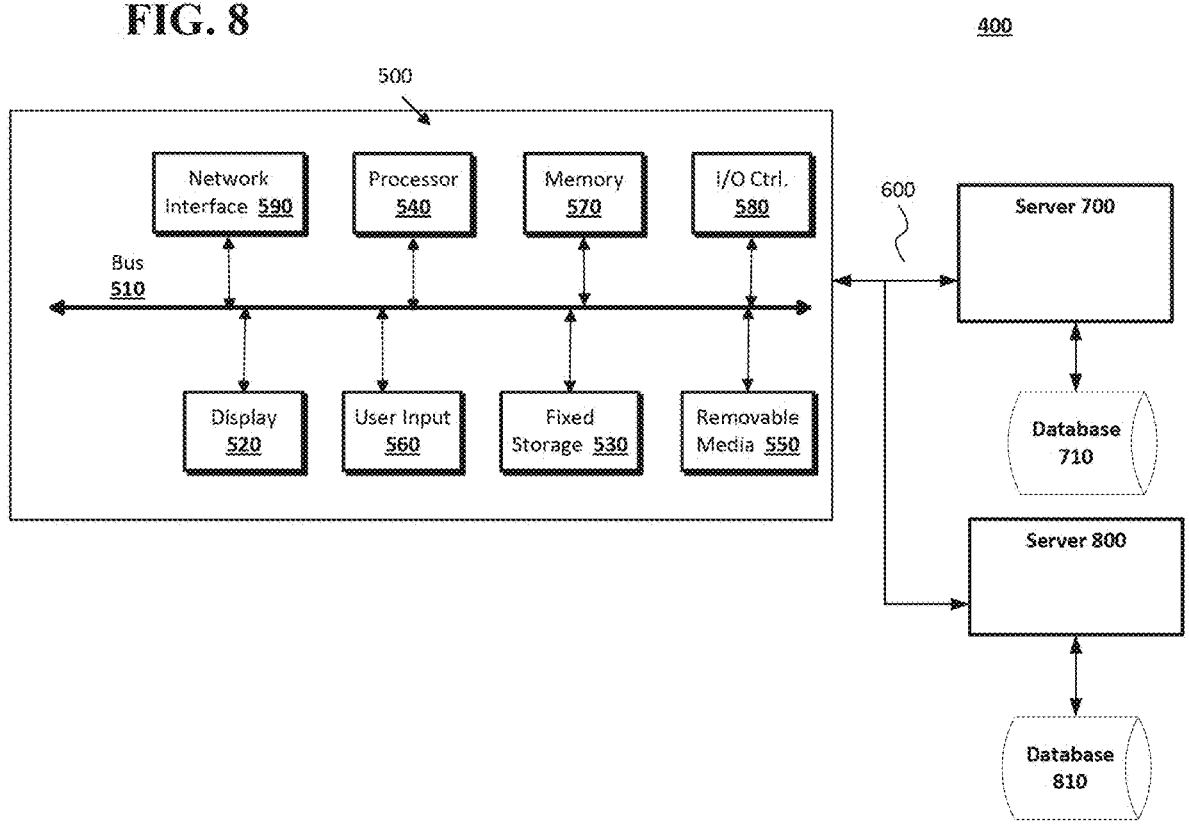
FIG. 8 shows a computer system according to an implementation of the disclosed subject matter.

Implementations of the presently disclosed subject matter may be implemented in and used with a variety of component and network architectures. FIG. 8 is an example computer 500 suitable for making requests to one or more servers and/or databases, and/or controlling and/or monitoring the operations detailed in method 100 and FIGS. 1-4. As discussed in further detail herein, the computer 500 may be a single computer in a network of multiple computers. In some implementations, the computer 500 may be used to execute one or more applications that may request data and/or processing from one or more services provided by server 700, database 710, server 800, and/or database 810. As shown in FIG. 8, the computer 500 may communicate with a server 700 and/or with a server 800 via a wired and/or wireless communications network 600. The server 700 and/or server 800 may be a hardware server, virtual machine, cloud server, database, cluster, application server, neural network system, or the like. The server 700 may be communicatively coupled to database 710 and/or may include database 710, and the server 800 may be communicatively coupled to database 810 and/or may include database 810. In some implementations, the first server described above in connection with method 100 may be server 700, and the second server may be server 800. Although two servers are shown in FIG. 8, there may be a plurality of servers that may be used in, for example, the computer network 200 shown in FIGS. 5-7. The database 710 and/or database 810 may use any suitable combination of any suitable volatile and non-volatile physical storage mediums, including, for example, hard disk drives, solid state drives, optical media, flash memory, tape drives, registers, and random access memory, or the like, or any combination thereof. The database 710 and/or database 810 may store data, such as private keys, certificates, tenant data, and the like. In some implementations, the database 710 may be database 212 shown in FIG. 5, and database 810 may be database 242.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 8 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "replacing", "taking", "applying", "attaching", "forcing", "switching", "adding", "configuring", "storing", "removing", restoring ", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
    replacing a first server of a first node a computer network configured to provide at least one service by adding a second server configured with a database system as a second node to the computer network;
    taking a snapshot of a first database of database files that is communicatively coupled to the first server;

applying the snapshot to the second server of the second node of the computer network by attaching the snapshot of the first database as a second database to the second server and configuring the second server to match the first server;

forcing a failover of the first server of the first node in the computer network to the second node with the second server in the computer network having the second database attached to maintain at least stateful aspects of the at least one service that comprise at least one selected from a group consisting of: expecting a response, tracking information, and resending a request; and switching voting to the second server of the second node of the computer network and removing the first node of the computer network when the forced failover is successful, and falling back to the first node and performing a rollback operation when the forced failover is unsuccessful.

2. The method of claim 1, wherein the adding the second server as the second node to the computer network comprises:

adding the second server to a failover cluster of the computer network that includes the first node.

3. The method of claim 2, wherein the adding the second server to the failover cluster comprises:

configuring an availability group to support a failover environment for a set of databases of the computer network.

4. The method of claim 1, further comprising:

storing an operating system on a first storage device communicatively coupled to the computer network; and storing at least one selected from a group consisting of: database engine binary files of the database system, and database system files on a separate storage device from at least user database files of the database system.

5. The method of claim 1, further comprising:

adding the second database to an availability group of the computer network and performing synchronous replication and synchronization of data from the first database to the second database using the snapshot.

6. The method of claim 5, further comprising:

forcing a failover of the computer network to the second node with the second server having the second database attached when the synchronous replication and synchronization is completed.

7. The method of claim 5, wherein the second server of the second node is added to the availability group as a non-voting member.

8. The method of claim 1, wherein the attaching the snapshot of the first database as the second database to the second server comprises keeping at least the first database in a recovery mode.

9. The method of claim 1, wherein the removing the first node of the computer network comprises:

removing the first node from a failover cluster and an always-on availability group.

10. The method of claim 1, further comprising:

restoring using backup data when the taking of snapshot of the computer network from the first node fails.

11. The method of claim 10, further comprising:

attaching the restored backup data to the second server when the snapshot fails.

12. The method of claim 1, wherein the replacing the first server by adding the second server comprises:

configuring the second server with at least one selected from the group consisting of: a new version of an operating system, a new version of an application, a new version of a database engine, a software update, a software patch, and a software bug fix.

* * * * *